United States Patent
Shen et al.

(10) Patent No.: US 12,338,980 B2
(45) Date of Patent: Jun. 24, 2025

(54) TOOL LAMP WITH MOBILE POWER SOURCE

(71) Applicant: NINGBO TALLER ELECTRICAL APPLIANCE CO., LTD., Yuyao (CN)

(72) Inventors: Jianli Shen, Yuyao (CN); Xiang Zhang, Yuyao (CN)

(73) Assignee: NINGBO TALLER ELECTRICAL APPLIANCE CO., LTD., Yuyao (CN)

( * ) Notice: Subject to any disclaimer, the term of this patent is extended or adjusted under 35 U.S.C. 154(b) by 900 days.

(21) Appl. No.: 17/451,445

(22) Filed: Oct. 19, 2021

(65) Prior Publication Data

US 2022/0390095 A1  Dec. 8, 2022

(30) Foreign Application Priority Data

Jun. 2, 2021 (CN) .......................... 202121224224.2
Jun. 2, 2021 (CN) .......................... 202121224940.0
Jun. 2, 2021 (CN) .......................... 202121227224.8

(51) Int. Cl.
*F21V 21/40* (2006.01)
*F21L 4/00* (2006.01)
*H02J 7/00* (2006.01)

(52) U.S. Cl.
CPC .............. *F21V 21/406* (2013.01); *F21L 4/00* (2013.01); *H02J 7/0047* (2013.01)

(58) Field of Classification Search
CPC ....................................................... F21L 4/00
See application file for complete search history.

(56) References Cited

U.S. PATENT DOCUMENTS

| 5,648,712 | A | * | 7/1997 | Hahn | H02J 7/0044 320/113 |
| 5,703,751 | A | * | 12/1997 | Huang | H02B 1/26 361/810 |
| 5,896,277 | A | * | 4/1999 | Leon | H04M 1/0262 455/575.8 |
| 2002/0158605 | A1 | * | 10/2002 | Sharrah | H02J 7/0044 320/115 |
| 2003/0039118 | A1 | * | 2/2003 | Osiecki | F21V 21/06 362/208 |
| 2005/0018435 | A1 | * | 1/2005 | Selkee | F21V 33/0076 362/240 |
| 2005/0184703 | A1 | * | 8/2005 | Parker | H02J 7/0042 320/114 |

(Continued)

FOREIGN PATENT DOCUMENTS

CN  210319495 U  4/2020

*Primary Examiner* — Tynese V McDaniel
(74) *Attorney, Agent, or Firm* — INNOVATION CAPITAL LAW GROUP, LLP; Vic Lin

(57) ABSTRACT

A tool lamp with a mobile power source, having a handle, a movable lamp base, and a mobile power box, wherein the handle is provided with a power chamber and a sliding slot, the power chamber has a strip-shaped opening, and a lock piece and a bottom hole are disposed in the power chamber; the movable lamp base is detachably connected to the handle; and the mobile power box is inserted into the power chamber via the strip-shaped opening, a push member is disposed in the mobile power box, is located in the bottom hole and is able to push the mobile power box out of the power chamber, and a groove portion is formed in a side wall of the mobile power box.

7 Claims, 14 Drawing Sheets

(56) References Cited

U.S. PATENT DOCUMENTS

| | | | | |
|---|---|---|---|---|
| 2005/0225288 A1* | 10/2005 | Cole, Jr. | ............... | H04B 1/20 320/114 |
| 2006/0139927 A1* | 6/2006 | Kovacik | ............... | F21V 21/08 362/183 |
| 2008/0231144 A1* | 9/2008 | Grant | ............... | H02J 7/1415 310/339 |
| 2008/0315832 A1* | 12/2008 | Kondo | ............... | H02J 7/0045 320/110 |
| 2010/0046212 A1* | 2/2010 | Thirouin | ............... | F21L 4/027 362/198 |
| 2011/0199757 A1* | 8/2011 | Cheng | ............... | F21V 33/00 362/183 |
| 2012/0008310 A1* | 1/2012 | Staeubli | ............... | F21L 4/027 362/109 |
| 2013/0170189 A1* | 7/2013 | Staeubli | ............... | F21V 21/145 362/109 |
| 2014/0361740 A1* | 12/2014 | Suzuki | ............... | H02J 7/0013 320/108 |
| 2015/0062883 A1* | 3/2015 | Shen | ............... | F21L 4/00 362/183 |
| 2015/0247628 A1* | 9/2015 | Li | ............... | F21V 29/70 362/183 |
| 2015/0333559 A1* | 11/2015 | Lohr | ............... | H01M 50/247 320/108 |
| 2015/0380709 A1* | 12/2015 | Mizrahi | ............... | H01M 50/209 429/93 |
| 2016/0040834 A1* | 2/2016 | Inskeep | ............... | F21L 4/04 362/197 |
| 2016/0093926 A1* | 3/2016 | Wright | ............... | H02J 7/0042 320/162 |
| 2016/0153626 A1* | 6/2016 | Ozaka | ............... | H02J 7/0029 362/183 |
| 2016/0249915 A1* | 9/2016 | Beckman | ............... | A61L 2/00 227/175.1 |
| 2017/0179448 A1* | 6/2017 | Hsu | ............... | H02J 7/0044 |
| 2019/0245360 A1* | 8/2019 | Clark | ............... | H01R 24/64 |
| 2019/0259985 A1* | 8/2019 | Hanawa | ............... | H02J 7/0045 |
| 2020/0031498 A1* | 1/2020 | Guo | ............... | H02J 7/00032 |
| 2020/0161886 A1* | 5/2020 | Saitoh | ............... | H01M 50/296 |
| 2020/0295580 A1* | 9/2020 | Bishop | ............... | H02J 7/0045 |
| 2021/0356104 A1* | 11/2021 | Thorne | ............... | H01M 50/262 |
| 2022/0057053 A1* | 2/2022 | Shen | ............... | H05B 45/10 |
| 2022/0181892 A1* | 6/2022 | Tian | ............... | H01M 10/44 |
| 2022/0390095 A1* | 12/2022 | Shen | ............... | F21V 21/406 |
| 2022/0403988 A1* | 12/2022 | Shen | ............... | F21V 21/30 |

* cited by examiner

TOOL LAMP WITH MOBILE POWER SOURCE

BACKGROUND OF THE INVENTION

1. Technical Field

The invention belongs to the technical field of lighting equipment, and relates to a tool lamp with a mobile power source.

2. Description of Related Art

A tool lamp, also referred to as a work lamp, is provided with a housing, a lamp base, and a power source. For example, Chinese Utility Model Patent Application No. CN201921585522.7 (Pub. No. CN210319495U) discloses a work lamp with a stable structure, comprising a lamp body, convex disks separately disposed on two sides of an upper end of the lamp body, receiving cavities formed in the upper end of the lamp body and corresponding to the interiors of the convex disks, positioning disks matched and connected with one side of inner walls of the convex disks, rotary disks matched and connected with the positioning disks, connecting portions connected into the convex disks and matched and rotatably connected with the rotary disks, and lamp bases matched and connected with tail ends of the connecting portions, wherein the lamp bases rotate around dampers of the lamp body, and ends of the positioning disks are inserted into the connecting portions and matched and rotatably connected with the connecting portions.

This work lamp is supplied with power by a battery. However, it is unreasonable in structure and is provided with a mobile power box which is difficult to assemble and disassemble, thus needing to be improved.

BRIEF SUMMARY OF THE INVENTION

The objective of the invention is to solve the abovementioned problems of the prior art by providing a tool lamp with a mobile power source.

The objective of the invention may be fulfilled through the following technical solution: a tool lamp with a mobile power source comprises:

A handle provided with a power chamber and a sliding slot, wherein the power chamber has a strip-shaped opening, a lock piece and a bottom hole are disposed in the power chamber, and a slidable slider is disposed in the sliding slot;

A movable lamp base detachably connected to the handle; and

A mobile power box inserted into the power chamber via the strip-shaped opening and provided with a push member located in the bottom hole, wherein the push member is able to push the mobile power box out of the power chamber, and a groove portion is formed in a side wall of the mobile power box; when the mobile power box is located in the power chamber, the lock piece is aligned with the groove, is pushed by the slider to move towards the groove portion, and finally, stretches into the groove portion to prevent the mobile power box from moving.

Preferably, the mobile power box comprises a shell and a power module embedded in the shell, the shell is provided with a communication interface connected to an external load, and the power module is electrically connected to the communication interface.

Preferably, the power module comprises a battery pack and a circuit board, the communication interface is provided with a first contact, a second contact, and a third contact, the first contact, the second contact, and the third contact are all electrically connected to the circuit board, the circuit board is provided with a first connecting point, a second connecting point, and a third connecting point, the first connecting point is connected to the first contact and a positive pole of the battery pack, the second connecting point is connected to the second contact, and the third connecting point is connected to the third contact and a negative pole of the battery pack.

Preferably, the first contact, the second contact, and the third contact are arranged side by side, the first contact and the third contact are located on two sides of the second contact respectively, the shell is provided with a first groove, a second groove, and a third groove that correspond to the first contact, the second contact, and the third contact respectively, the first contact and the third contact each have an open end, and a closed end electrically connected to the circuit board, the first contact is embedded in the first groove, the third contact is embedded in the third groove, the second contact is T-shaped and comprises a horizontal end and a vertical end, a horizontal groove and a vertical groove are formed in the second groove and are connected by means of a first guide slot, the horizontal end is disposed in the horizontal groove, and the vertical end is disposed in the vertical groove.

Preferably, the shell comprises a first shell provided with the communication interface and a second shell embedded with the power module, and the first shell and the second shell are detachably connected.

Preferably, the power module further comprises:

A power input module;

A control module comprising a control chip U1, wherein a second pin of the control chip U1 is connected to the external load by means of a first connecting piece;

A power output module connected to the control chip U1, used for outputting electric energy, obtained by charging the battery pack, in a preset manner, and comprising a first output unit and a second output unit, wherein the first output unit is used for outputting the electric energy, obtained by charging the battery pack, to the external load in a plugged manner by means of a second connecting piece, and controlling an output state according to a control signal sent by the control module, and the second output unit is used for outputting the electric energy, obtained by charging the battery pack, to the external load by means of a USB interface, and controlling the output state according to the control signal sent by the control module; and A display module connected to the control chip U1 and used for displaying a remaining service time of the battery pack in a state where the battery pack is connected to the external load.

Preferably, the first output unit comprises a MOS transistor Q1, a MOS transistor M2, a resistor R1, a resistor R24, a resistor R26, and a connecting piece J3;

A positive pole of the connecting piece J3 is connected to the positive pole of the battery pack, a negative pole of the connecting piece J3 is connected to a fourth pin of the control chip U1, a fifth pin of the MOS transistor Q1 and a fifth pin of the MOS transistor Q2, and is grounded by means of the resistor R24; a fourth pin and a sixth pin of the MOS transistor Q1 and a fourth pin and a sixth pin of the MOS transistor Q2 are connected to a third pin of the control chip U1; a first pin and a third pin of the MOS transistor Q1 and a first pin and a third pin of the MOS transistor Q2 are connected to a fourteenth pin of the control chip U1 by means of the resistor R26, and a third pin of the MOS transistor Q2 is grounded by means of the resistor R1;

The second output unit comprises: a connecting piece J1, a MOS transistor Q4, a resistor R2, a resistor R9, a resistor R11, a resistor R12 and a resistor R27;

A first pin of the connecting piece J1 is connected to the power input module, a second pin and a third pin of the connecting piece J1 are connected, a fourth pin of the connecting piece J1 is connected to a drain of the MOS transistor Q4, a gate of the MOS transistor Q4 is connected to a thirteenth pin of the control chip U1 and one terminal of the resistor R11, the other terminal of the resistor R11 is grounded; a source of the MOS transistor Q4 is connected to one terminal of the resistor R12 and one terminal of the resistor R27, the other terminal of the resistor R12 is grounded, the other terminal of the resistor R27 is connected to an eleventh pin of the control chip U1, and a fourth pin of the connecting piece J1 is grounded by means of the resistor R2 and is connected to a sixth pin of the control chip U1 by means of the resistor R9.

Preferably, the power input module comprises: a charge and discharge chip U2, a connecting piece J2, a MOS transistor Q3, an inductor L1, a resistor R3, a resistor R5, a resistor R6, a resistor R8, a capacitor C2, and a capacitor C3;

A first pin of the connecting piece J2 is connected to an external power source, and is connected to a fifth pin of the control chip U1 by means of the resistor R3; the first pin of the connecting piece J2 is connected to one terminal of the resistor R5, one terminal of the resistor R6 and a source of the MOS transistor Q3, the other terminal of the resistor R5 is grounded by means of the capacitor C3, the other terminal of the resistor R6 is connected to a gate of the MOS transistor Q3 and a first pin of the control chip U1; a drain of the MOS transistor Q3 is connected to a fourth pin of the charge and discharge chip U2, a first pin of the charge and discharge chip U2 is connected to one terminal of the resistor R8 and one terminal of the inductor L1, the other terminal of the resistor R8 is grounded by means of the capacitor C2, the other terminal of the inductor L1 is connected to a third pin of the charge and discharge chip U2, a second pin of the charge and discharge chip U2 is grounded, a third pin of the charge and discharge chip U2 is connected to the positive pole of the battery pack, and an eighth pin of the charge and discharge chip U2 is connected to the power output module.

Preferably, the display module comprises: a nixie tube L1, a resistor R18, a resistor R19, a resistor R20, a resistor R21, a resistor R22, and a resistor R23;

A first pin of the nixie tube L1 is connected to a twentieth pin of the control chip U1 by means of the resistor R18, a nixie tube LED2 is connected to a nineteenth pin of the control chip U1 by means of the resistor R19, a nixie tube LED3 is connected to an eighteenth pin of the control chip U1 by means of the resistor R20, a nixie tube LED4 is connected to a seventeenth pin of the control chip U1 by means of the resistor R21, a nixie tube LED5 is connected to a sixteenth pin of the control chip U1 by means of the resistor R22, and a nixie tube LED6 is connected to a fifteenth pin of the control chip U1 by means of the resistor R23.

Preferably, the power module further comprises a monitoring module, and the monitoring module comprises a temperature monitoring unit used for monitoring a working temperature of the mobile power source and a voltage monitoring unit used for monitoring a voltage state of the battery pack, the temperature monitoring unit comprises a temperature sensor connected to the control chip U1, and the voltage monitoring unit comprises a voltage sensor connected to the control chip U1.

Compared with the prior art, the invention has the following beneficial effects:

1. The mobile power box can be disassembled from or assembled into the power chamber as needed, and can be locked and unlocked merely by sliding the slider, and users can take the mobile power box out of the power chamber by pushing the push member.
2. The shell is provided with the communication interface connected to the external load, so that the mobile power source can obtain the working current of the external load and transmit obtained information to the power module, and then the power module calculates the remaining service time of the mobile power source according to the working current of the load and the capacity of the battery pack, so that users can visually obtain the remaining service time of the mobile power source and charge or replace the mobile power source in time to ensure normal use of the load.
3. The mobile power source can supply power to the external load by means of the contacts, can also supply power to other small electrical appliances such as mobile phones and fans through USB port, and can be charged by means of a MICRO interface, thus being wide in application range, easy to carry, and capable of realizing multiple purposes.
4. The control chip U1 communicates with the external load by means of the first connecting piece to obtain working information of the external load, and calculates the actual remaining service time of the battery pack according to the working information of the load and the capacity information of the battery pack when the battery pack is connected to the external load, so that users can visually obtain the remaining service time of the mobile power source.
5. A second pin and a third pin of the protection chip U3 are both connected to the negative pole of the battery pack, and a fourth pin and a fifth pin of the protection chip U3 are both grounded. The voltage and current of batteries can be monitored in real time by means of the protection chip U3; and when the batteries are under-voltage, over-voltage, or over-current, an output of the battery pack is turned off, so that damage to the mobile power source caused by an abnormal condition is avoided.

Figure 1:
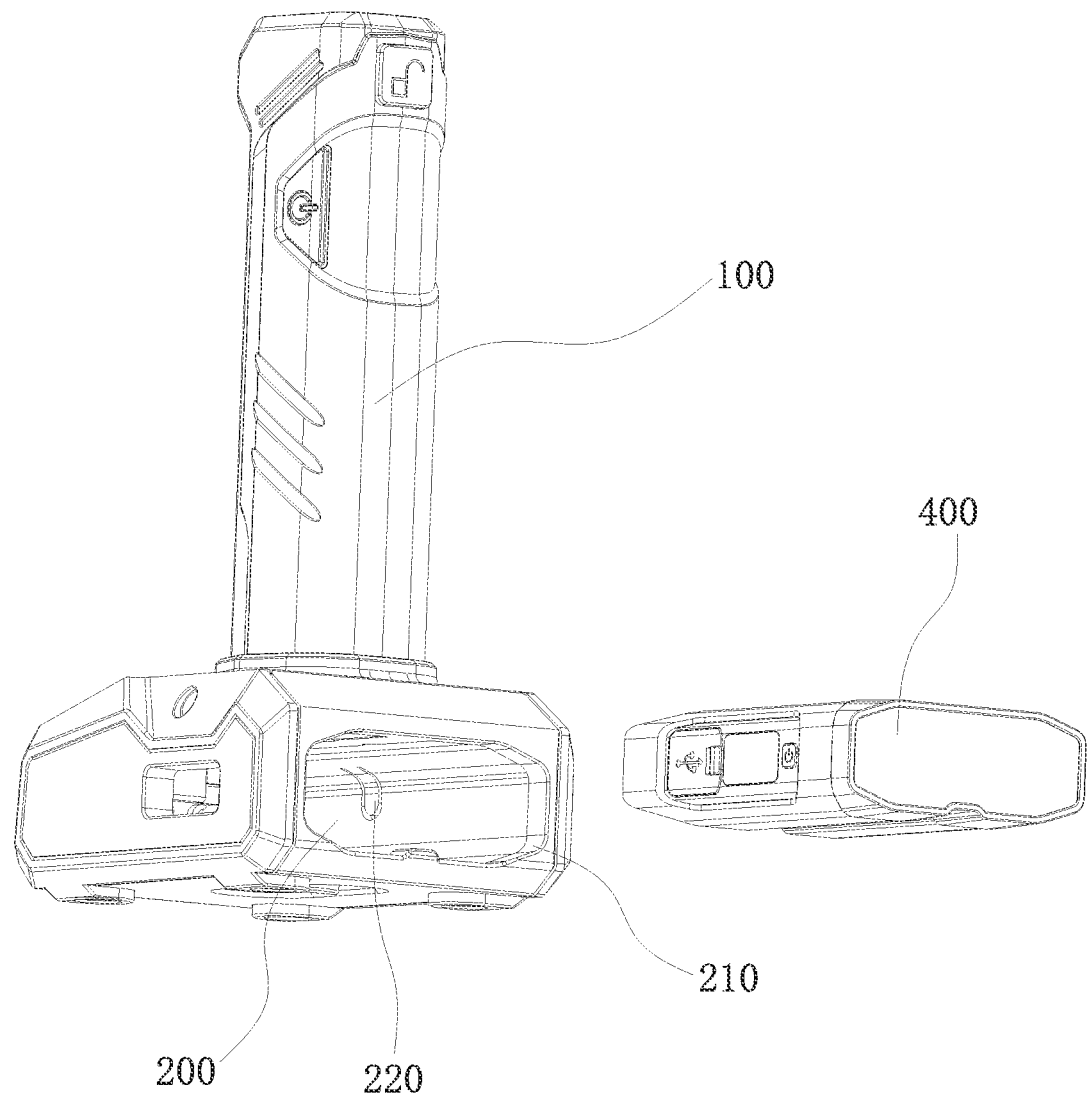
FIG. 1 is a disassembled structural view of a handle and a mobile power box according to the invention.
Figure 2:
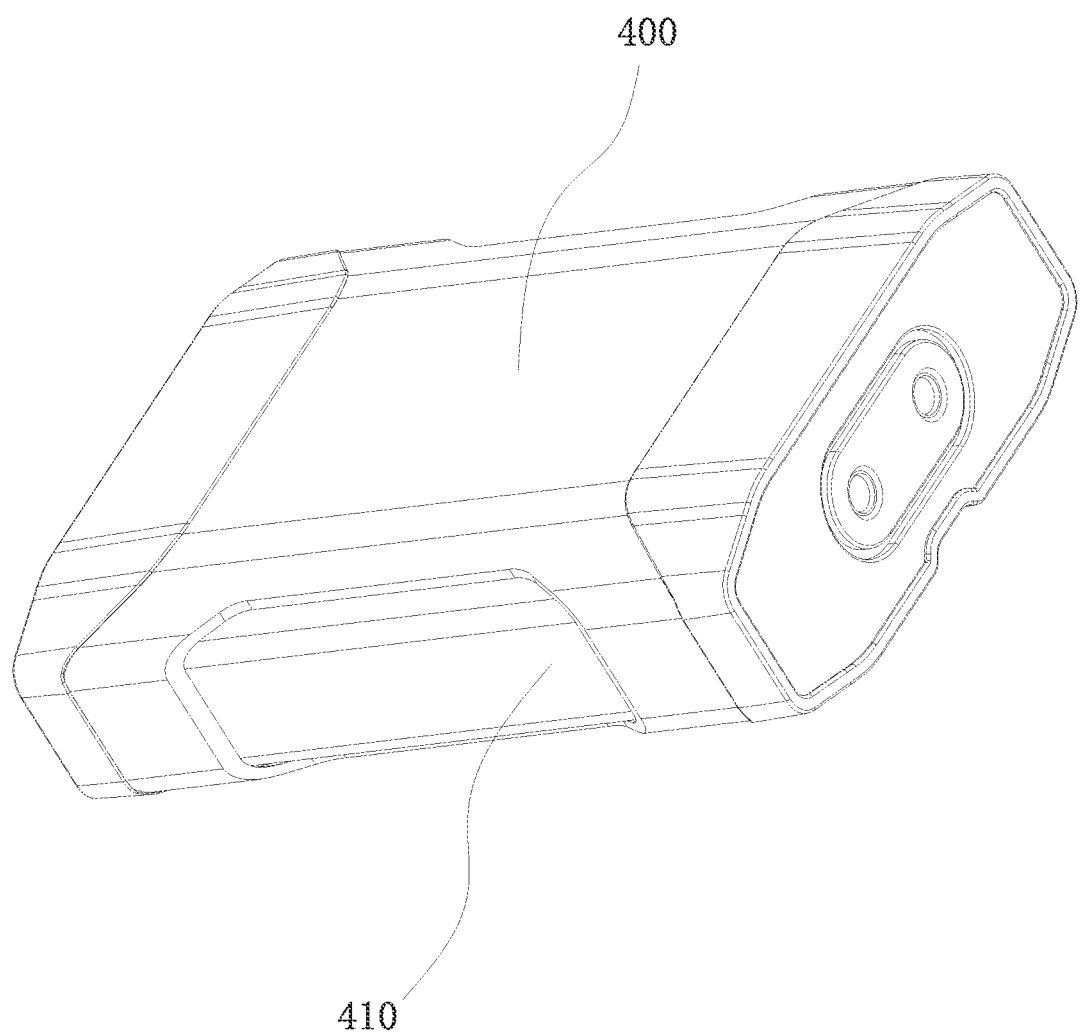
FIG. 2 is a structural view of the mobile power box according to the invention.
Figure 3:
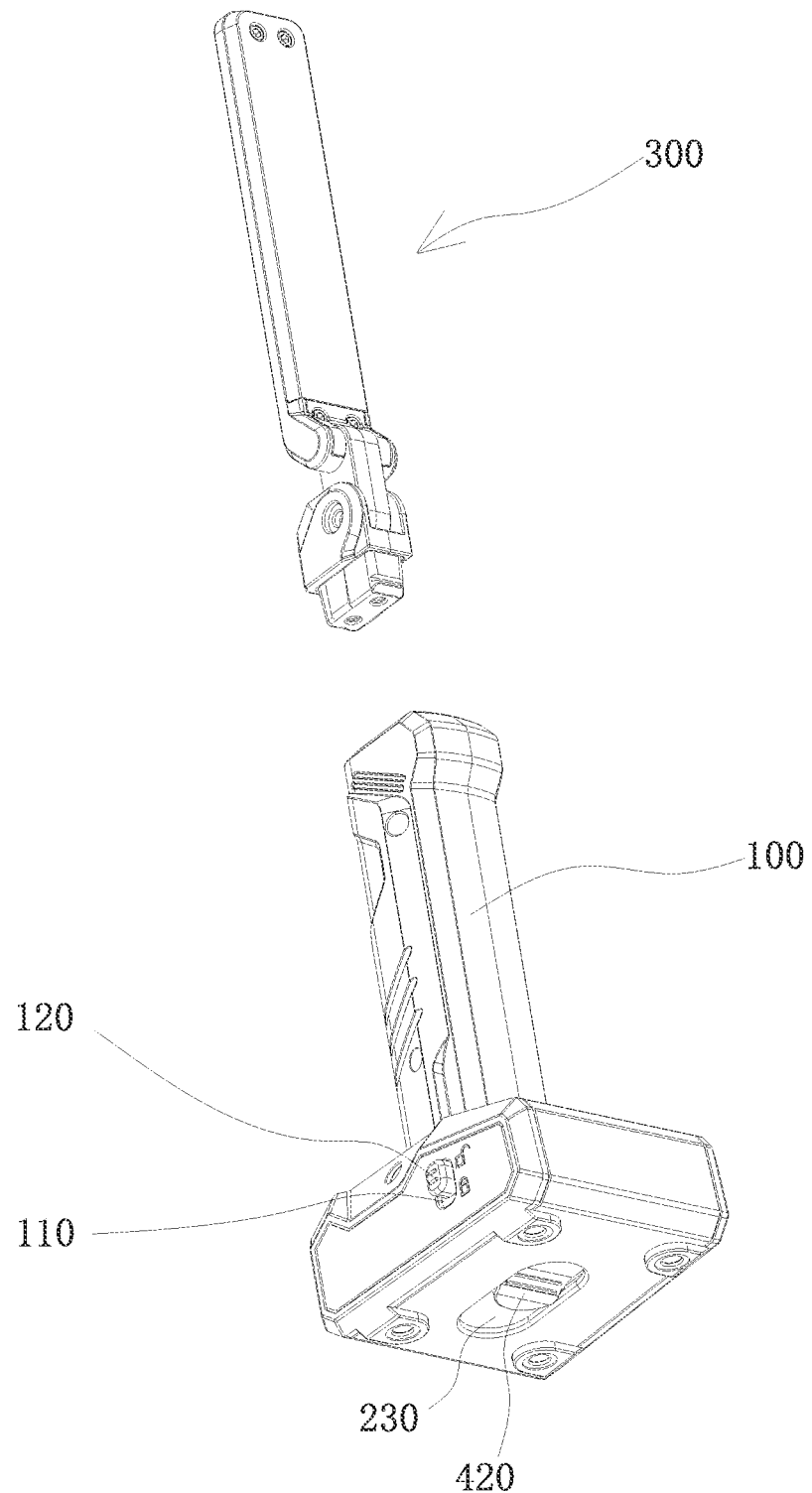
FIG. 3 is a disassembled structure view of the handle and a movable lamp base according to the invention.
Figure 4:
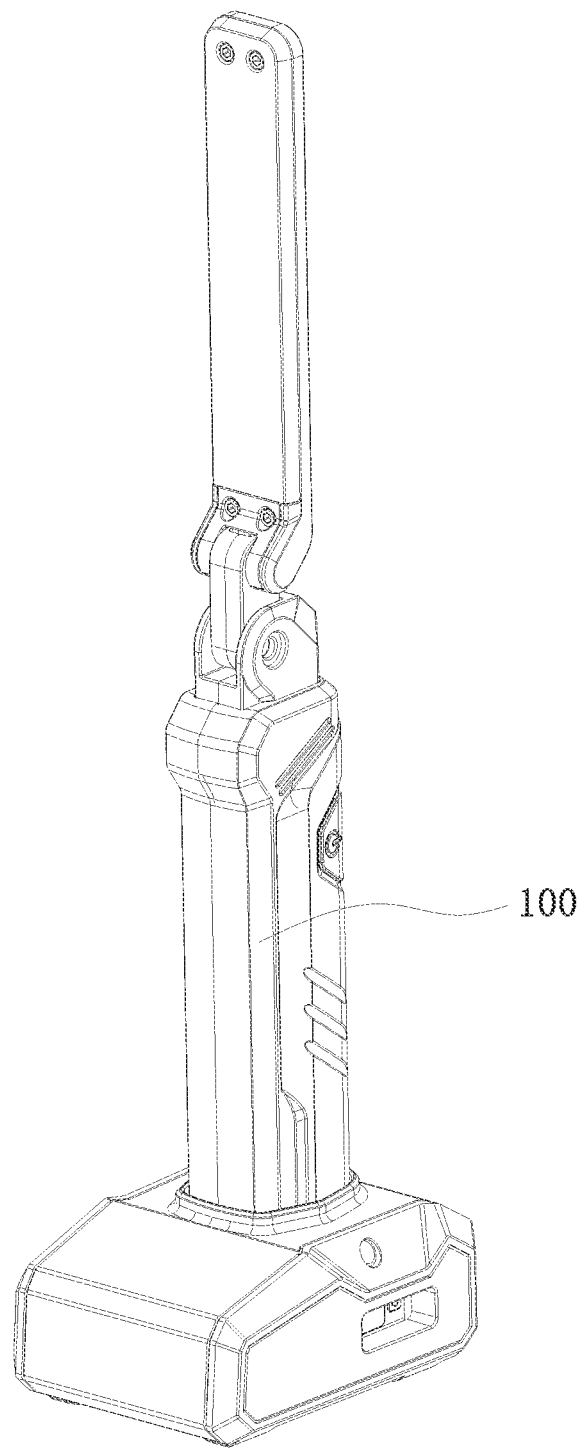
FIG. 4 is a structural view of a movable lamp base which is a strip-shaped lamp base according to the invention.

In the figures: 100, handle; 110, sliding slot; 120, slider; 200, power chamber; 210, strip-shaped opening; 220, lock piece; 230, bottom hole; 300, movable lamp base; 400, mobile power box; 410, groove portion; 420, push member; 500, shell; 510, first groove; 520, second groove; 521, first guide slot; 530, third groove; 540, first shell; 550, second shell; 600, power module; 610, battery pack; 620, circuit board; 621, nixie tube; 700, communication interface; 710, first contact; 720, second contact; 721, horizontal end; 722, vertical end; 730, third contact; 740, open end; 741, guide portion; 742, protruding portion; 750, closed end.

DETAILED DESCRIPTION OF THE INVENTION

The technical solution of the invention will be further described below in conjunction with the specific embodiments and accompanying drawings of the invention. Clearly, the invention is not limited to the following embodiments.

As shown in FIG. 1, FIG. 2, FIG. 3, and FIG. 4, a tool lamp with a mobile power source comprises a handle 100, a movable lamp base 300, and a mobile power box 400. The mobile power box 400 can supply power to the tool lamp, can be charged repeatedly, and can also supply power to other devices (such as mobile phones), thus having multiple functions and being convenient to use.

Wherein, the handle 100 is provided with a power chamber 200 and a sliding slot 110, wherein the power chamber 200 has a strip-shaped opening 210, a lock piece 220, and a bottom hole 230 are disposed in the power chamber 200, and a slidable slider 120 is disposed in the sliding slot 110.

Preferably, the handle 100 is of a long strip-shaped structure, the power chamber 200 is disposed at a lower end of the handle 100 and is communicated with the outside by means of the strip-shaped opening 210, the mobile power box 400 is able to enter the power chamber, and the lock piece 220 is actually located in the power chamber 200 and is able to bend and deform towards the interior of the power chamber 200; a locking position and an unlocking position are formed at two ends of the sliding slot 110 respectively; when located at the unlocking position, the slider 120 will not touch the lock piece 220, so the mobile power box 400 will not be clamped by the lock piece 220.

The movable lamp base 300 is detachably connected to the handle 100. Preferably, the movable lamp base 300 is a UV light source or a common light source and is disposed at a front end of the handle 100, and the mobile power box 400 is able to supply power to the movable lamp base 300.

The mobile power box 400 may be inserted into the power chamber 200 via the strip-shaped opening 210 and is provided with a push member 420, the push member 420 is located in the bottom hole 230 and is able to push the mobile power box 400 out of the power chamber 200, and a groove portion 410 is formed in a side wall of the mobile power box 400; when the mobile power box 400 is located in the power chamber 200, the lock piece 220 is aligned with the groove portion 410, is then pushed by the slider 120 to move towards the groove portion 410, and finally stretches into the groove portion 410 to prevent the mobile power box 400 from moving.

Preferably, the mobile power box 400 is of a box structure and exactly fits an inner cavity of the power chamber 200. In an actual structure, the mobile power box 400 is located in the power chamber 200. When assembled, the mobile power box 400 is inserted into the power chamber 200 via the strip-shaped opening 210. When disassembled, the mobile power box 400 is pulled out of the power chamber 200 via the strip-shaped opening 210.

The mobile power box 400 can be disassembled to be charged or supply power to other devices, and thus can be used repeatedly. In addition, when the mobile power box 400 is located in the power chamber 200, the lock piece 220 may be pressed to bend into the groove portion 410, at this moment, the mobile power box 400 is prevented from moving by the lock piece 220 and is locked in the power chamber 200, and thus, the tool lamp can be used normally.

Because it is difficult to take the mobile power box 400 out of the power chamber 200, the bottom hole 230 is specially formed in the bottom of the power chamber 200 to allow the mobile power box to be taken out of the power chamber 200 easily, the push member 420 is disposed at the bottom of the mobile power box 400, and when the mobile power box 400 is located in the power chamber 200, the push member 420 is exactly located in the bottom hole 230, so users can easily take the mobile power box 400 out of the power chamber 200 by pushing the push member 420.

Figure 5:
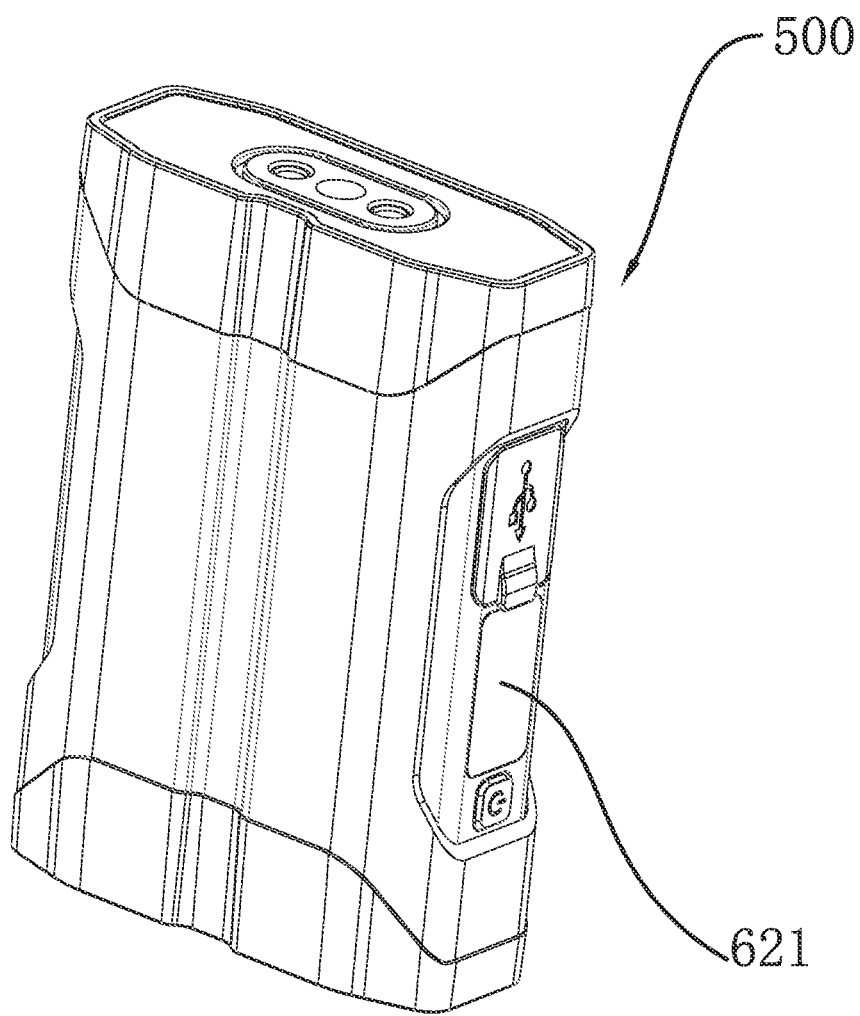
FIG. 5 is an overall structural view of the mobile power box according to the invention.
Figure 6:
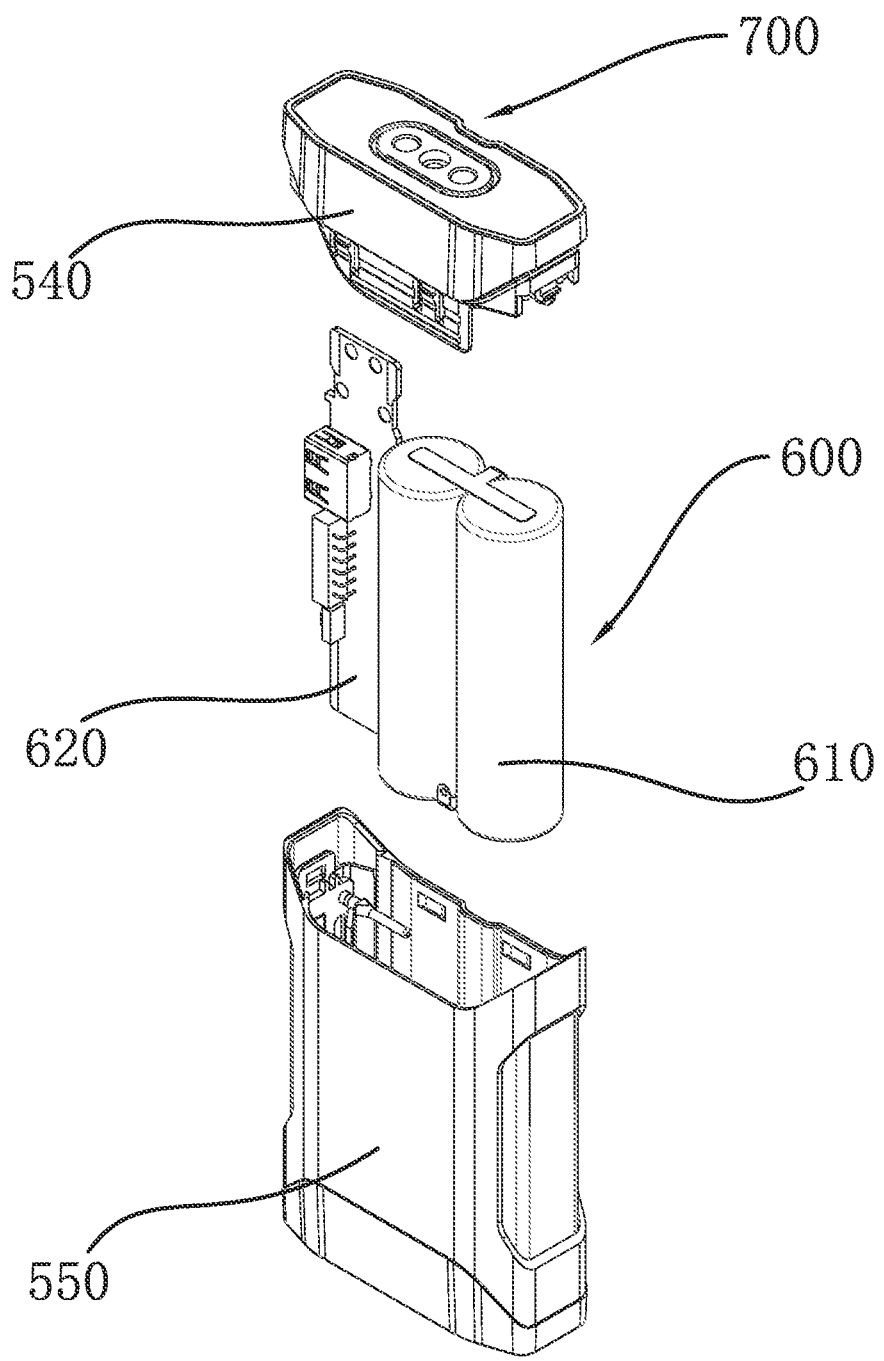
FIG. 6 is an exploded view of the mobile power box according to the invention.

As shown in FIG. 5 and FIG. 6, based on the above implementation, the mobile power box 400 comprises a shell 500 and a power module 600 embedded in the shell 500, the shell 500 is provided with a communication interface 700 connected to an external load, and the power module 600 is electrically connected to the communication interface 700.

The shell 500 is provided with the communication interface 700 connected to the external load, so that the mobile power source can obtain the working current of the external load and transmit obtained information to the power module 600, and then the power module 600 calculates the remaining service time of the mobile power source according to the working current of the load and the capacity of a battery pack 610 and displays the actual remaining service time and remaining battery capacity according to different loads, so that users can visually obtain the remaining service time of the mobile power source and charge the mobile power source in time to ensure normal use of the load.

Figure 7:
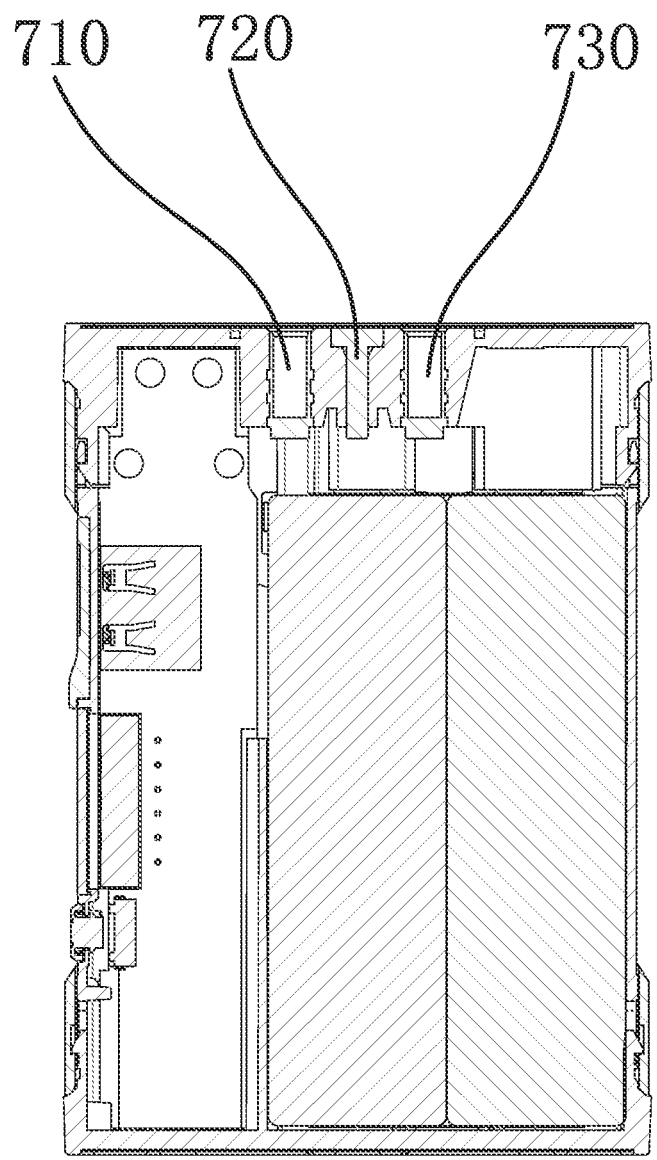
FIG. 7 is a sectional view of the mobile power box according to the invention.

As shown in FIG. 6 and FIG. 7, on the basis of the above implementation, the power module 600 comprises a battery pack 610 and a circuit board 620, the communication interface 700 is provided with a first contact 710, a second contact 720, and a third contact 730, the first contact 710, the second contact 720, and the third contact 730 are all electrically connected to the circuit board 620, the circuit board 620 is provided with a first connecting point, a second connecting point, and a third connecting point, the first connecting point is connected to the first contact 710 and a positive pole of the battery pack 610, the second connecting point is connected to the second contact 720, and the third connecting point is connected to the third contact 730 and a negative pole of the battery pack 610.

The communication interface 700 comprises three contacts, the circuit board 620 is provided with connecting points corresponding to the contacts, the first contact 710 and the third contact 730 are power interfaces and are connected to the positive pole and the negative pole of the battery pack 610 respectively, one end of the first contact 710 is connected to a positive pole of the external load, the other end of the first contact 710 is connected to the positive pole of the battery pack 610 by means of the first connecting point, one end of the third contact 730 is connected to a negative pole of the external load, the other end of the third contact 730 is connected to the negative pole of the battery pack 610 by means of the third connecting point, and the mobile power source supplies power to the external load by means of the first contact 710 and the third contact 730, that is, a power input terminal of the external load is plugged into the first contact 710 or the third contact 730 to be supplied with power. The second contact 720 is a signal interface and is connected to the external load, such that the mobile power source can obtain the working current of the external load and calculate the remaining service time of the mobile power source according to the working current of the external load and the remaining capacity of the battery pack 610, users can visually know the remaining service time of the load and reasonably set the charge frequency of the mobile power source, and thus, the situation where the working efficiency of the load is affected due to insufficient power supply of the mobile power source is avoided.

Figure 8:
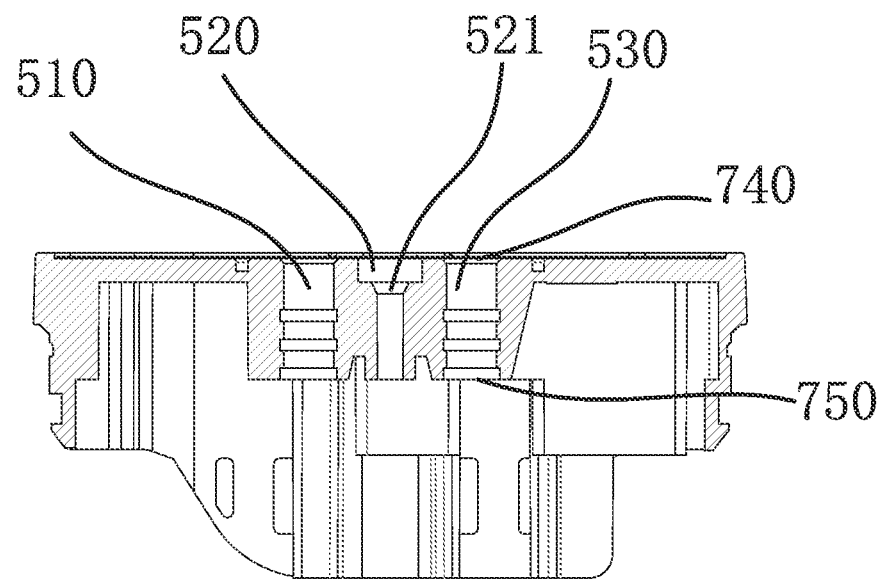
FIG. 8 is a sectional view of a first shell of the mobile power box according to the invention.
Figure 9:
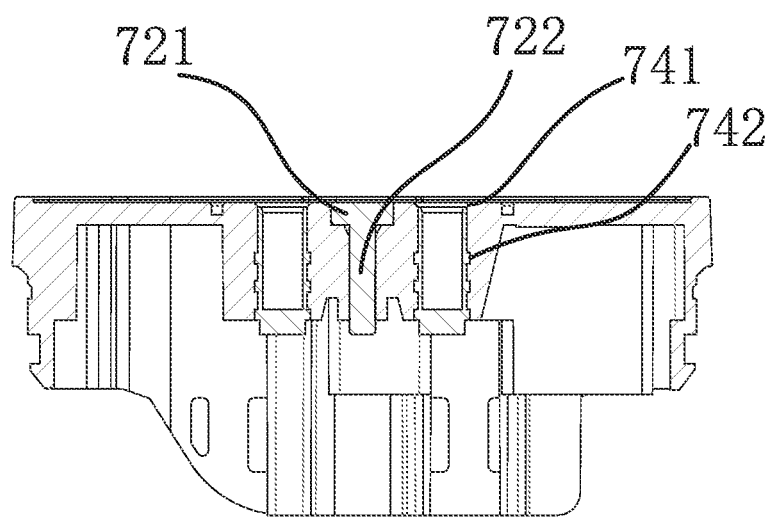
FIG. 9 is a partial enlarged view of the mobile power box according to the invention.

As shown in FIG. 7, FIG. 8, and FIG. 9, on the basis of the above implementation, the first contact 710, the second contact 720, and the third contact 730 are arranged side by side, the first contact 710 and the third contact 730 are located on two sides of the second contact 720 respectively, the shell 500 is provided with a first groove 510, a second groove 520, and a third groove 530 that correspond to the first contact 710, the second contact 720, and the third contact 730 respectively, the first contact 710 and the third contact 730 each comprise an open end 740, and a closed end 750 electrically connected to the circuit board 620, the first contact 710 is embedded in the first groove 510, the third contact 730 is embedded in the third groove 530, the second contact 720 is T-shaped and comprises a horizontal end 721 and a vertical end 722, a horizontal groove and a vertical groove are formed in the second groove 520 and are connected by means of a first guide slot 521, the horizontal end 721 is arranged in the horizontal groove, and the vertical end 722 is arranged in the vertical groove.

Preferably, the first contact 710, the second contact 720, and the third contact 730 are all embedded in the shell 500, the second contact 720 is located between the first contact 710 and the third contact 730, the first contact 710 and the third contact 730 are each of a cylindrical structure with a half through-hole, and the power input terminal of the external load is inserted into the through hole of the first contact 710 or the through hole of the third contact 730 to supply with power, so that quick power supply is realized. The open end 740 of the cylindrical structure comprises a guide portion 741, and the power input terminal of the external load can be easily plugged into the first contact 710 or the third contact 730 by means of the guide portion 741. In addition, annular protruding portions 742 are arranged on outer surfaces of the first contact 710 and the third contact 730 and are in concave-convex fit with the first groove 510.

To enhance the fitting firmness to avoid disengagement caused by a loose fit, the second contact 720 is embedded in the second groove 520 and is guided by the first guide slot 521, and when to be assembled in the second groove 520, the second contact 720 is aligned with the second groove 520 and is then inserted into the second groove 520, and the second contact 720 can be easily inserted into the second groove 520 in place under the effect of the first guide slot 521, so that automatic assembly is realized.

As shown in FIG. 6, on the basis of the above implementation, the shell 500 comprises a first shell 540 provided with the communication interface 700 and a second shell 550 embedded with the power module 600, and the first shell 540 and the second shell 550 are detachably connected.

The first shell 540 and the second shell 550 are detachably connected, and in actual assembly, the power module 600 is assembled in the second shell 550, and then the first shell 540 and the second shell 550 are clamped together, so that the power module 600 can be assembled, maintained, and replaced easily.

Figure 10:
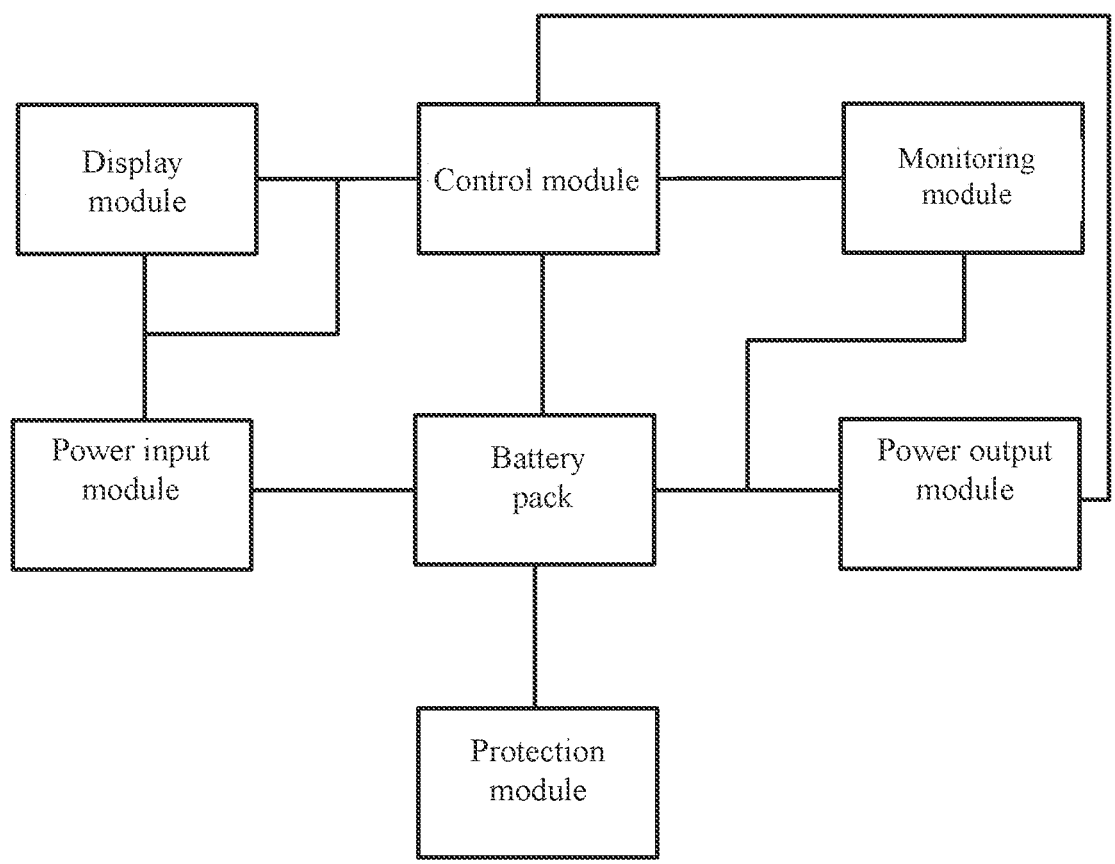
FIG. 10 is an overall structural view of a power module according to the invention.
Figure 11:
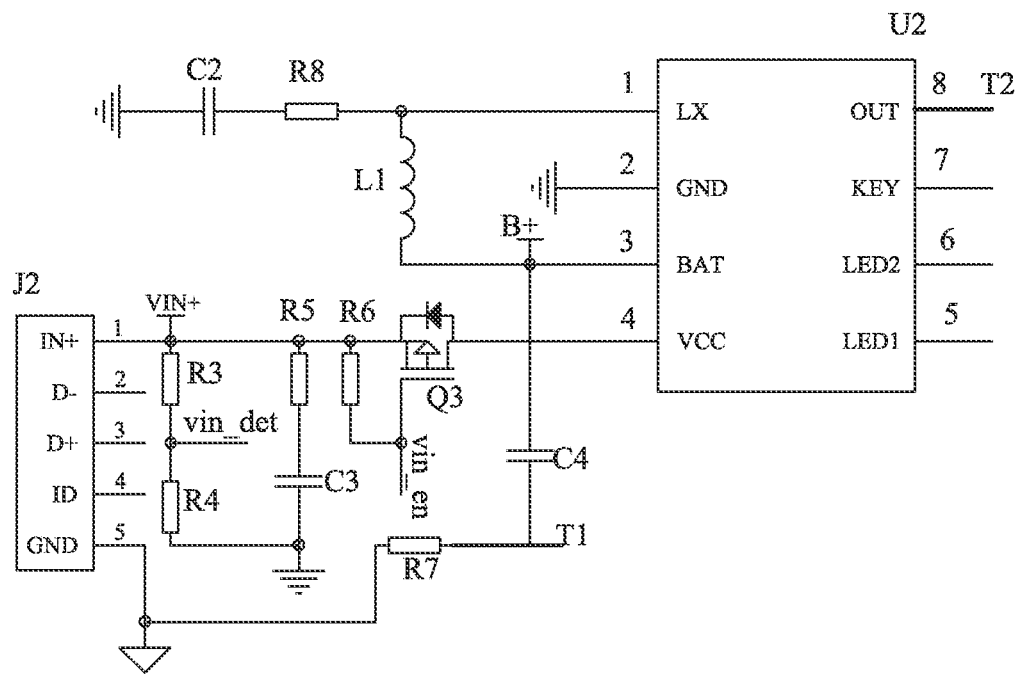
FIG. 11 is a circuit diagram of a power input module according to the invention.
Figure 12:
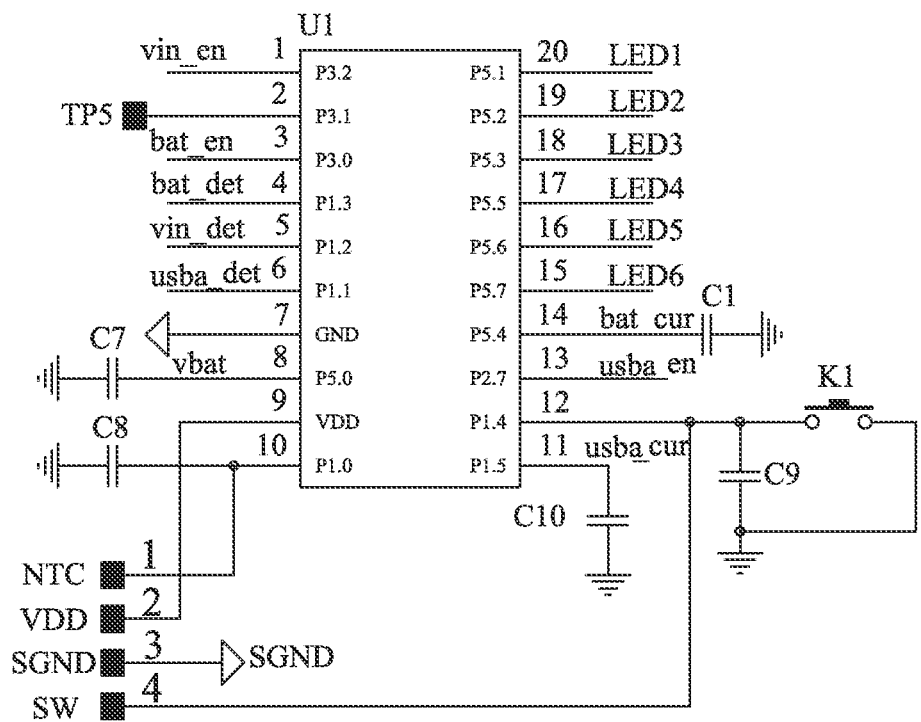
FIG. 12 is a circuit diagram of a control module according to the invention.
Figure 13:
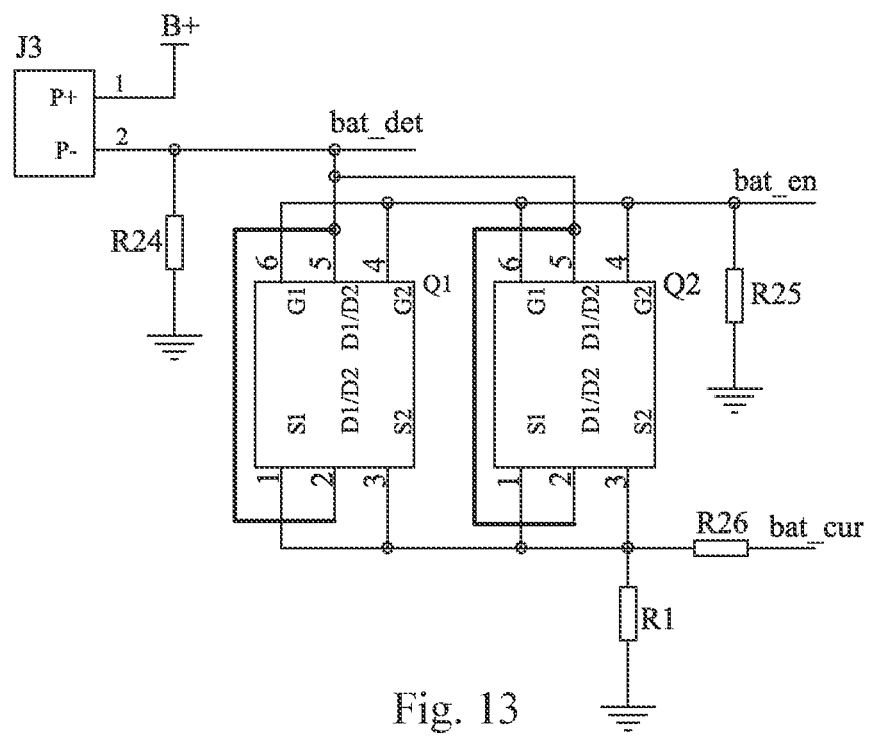
FIG. 13 is a circuit diagram of a first output unit according to the invention.
Figure 14:
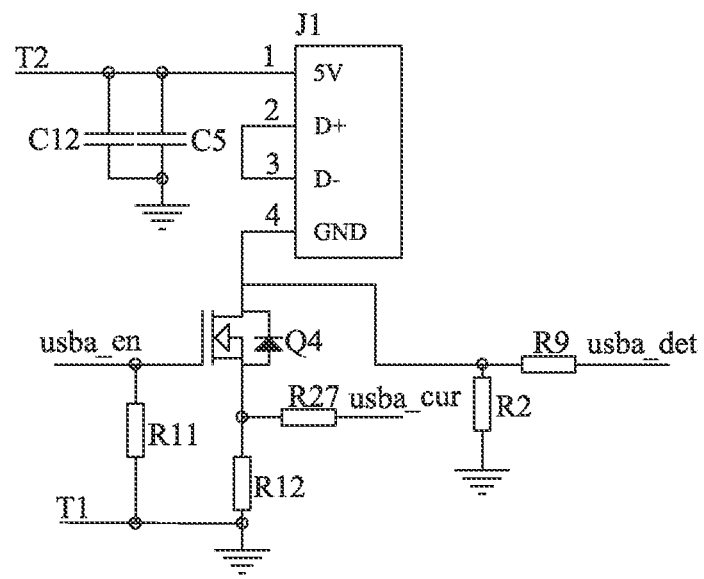
FIG. 14 is a circuit diagram of a second output unit according to the invention.
Figure 15:
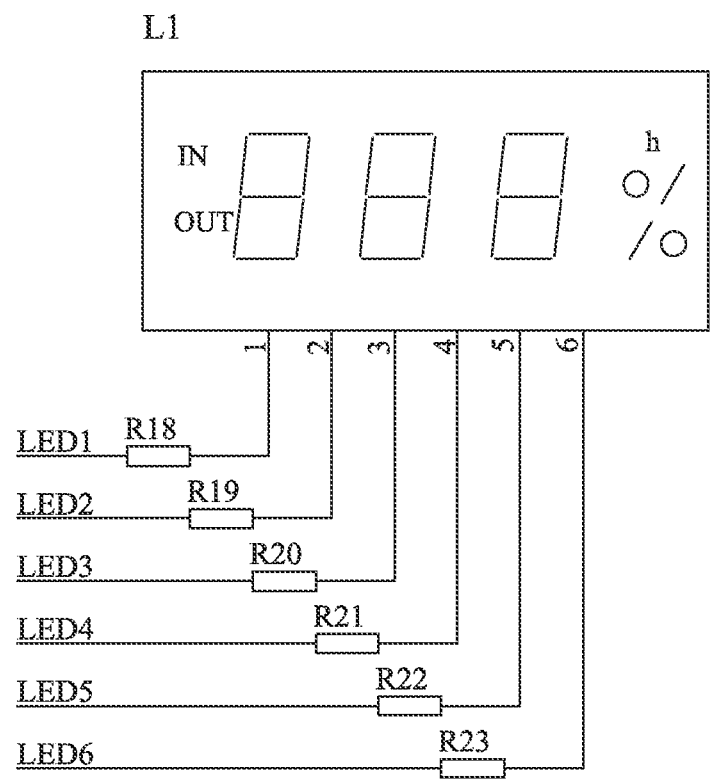
FIG. 15 is a circuit diagram of a display module according to the invention.
Figure 16:
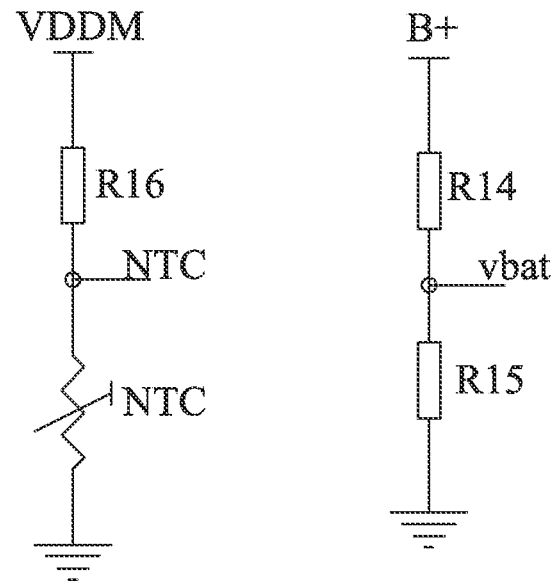
FIG. 16 is a circuit diagram of a monitoring module according to the invention.
Figure 17:
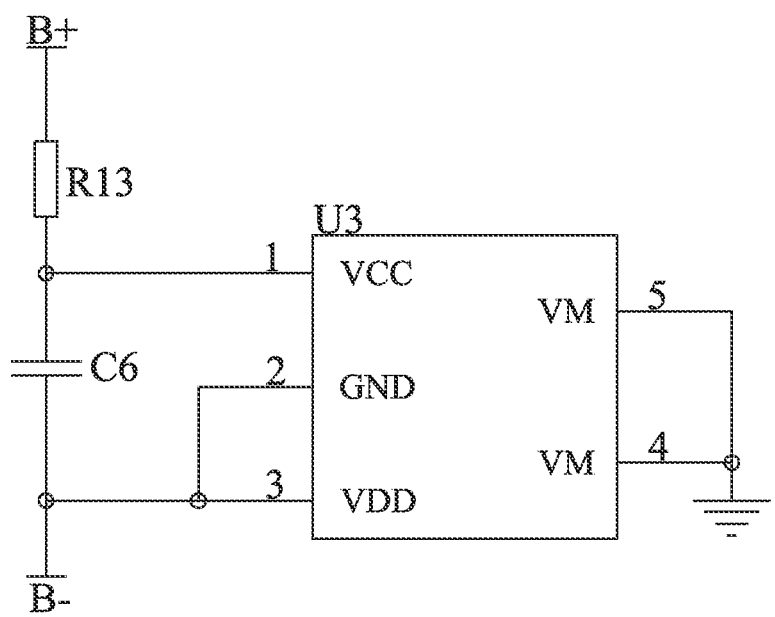
FIG. 17 is a circuit diagram of a protection module according to the invention.

As shown in FIG. 10 and FIG. 17, on the basis of the above implementation, the power module further comprises a power input module, a control module, a power output module, and a display module.

Wherein, the power input module is connected to an external power source to supply power to the battery pack;

The control module comprises a control chip U1, and a second pin of the control chip U1 is connected to the external load by means of a first connecting piece; and the control chip U1 is used for generating a control signal according to a communication signal transmitted by the external load and monitoring the working state of the mobile power source in real time.

The control chip U1 is preferably a chip CSU38M20, and is connected to the external load by means of the first connecting piece to obtain working information of the external load, calculate the remaining service life of the mobile power source according to the working current of the load and the capacity of the battery pack, and display the capacity information and remaining service time, such that users can visually know the actual remaining time of the mobile power source under the condition where the mobile power source is connected to the external load, and charge or replace the mobile power source reasonably according to the remaining time to ensure that the working efficiency of the external load will not be affected.

The power output module is connected to the control chip U1, is used for outputting electric energy, obtained by charging the battery pack, in a preset manner, and comprises a first output unit and a second output unit, wherein the first output unit outputs the electric energy, obtained by charging the battery pack, to the external load in a plugged manner by means of a second connecting piece and controls the output state according to a control signal sent by the control module, and the second output unit outputs the electric energy, obtained by charging the battery pack, to the external load by means of a USB interface and controls the output state according to the control signal sent by the control module.

The mobile power has two output modes. In one output mode, the external load is connected to the mobile power source in a plugged manner and is directly plugged into the mobile power source to be charged; and in the other output mode, the mobile power source transmits power by means of a USB interface, and in this case, the mobile power is similar to a common mobile power source and can be carried by users for use. In this way, the mobile power source can be used for multiple purposes and is easy to use and efficient.

The display module is connected to the control chip U1 and is used for displaying the remaining service time of the battery pack in a state where the battery pack is connected to the external load.

As shown in FIG. 1, on the basis of the above implementation, the first output unit comprises: a MOS transistor Q1, a MOS transistor Q2, a resistor R1, a resistor R24, a resistor R26, and a connecting piece J3;

A positive pole of the connecting piece J3 is connected to the positive pole of the battery pack, a negative pole of the connecting piece J3 is connected to a fourth pin of the control chip U1, a fifth pin of the MOS transistor Q1, and a fifth pin of the MOS transistor Q2 and is grounded by means of the resistor R24; a fourth pin and a sixth pin of the MOS transistor Q1 and a fourth pin and a sixth pin of the MOS transistor Q2 are all connected to a third pin of the control chip U1; a first pin and a third pin of the MOS transistor Q1 and a first pin and a third pin of the MOS transistor Q2 are connected to a fourteenth pin of the control chip U1 by means of the resistor R25, and a third pin of the MOS transistor Q2 is grounded by means of the resistor R1.

Preferably, the positive pole of the connecting piece J3 is connected to the battery pack, and the MOS transistor Q1 and the MOS transistor Q2 control the mobile power source to output power to the external load; in a normal state, after the external load is turned on, the control chip U1 communicates with the external load and transmits an enable signal to the MOS transistor Q1 and the MOS transistor Q2 to control the MOS transistor Q1 and the MOS transistor Q2 to be turned on, so that the battery pack can normally output power to the external load; and under an abnormal condition such as over-voltage or over-current, the control chip U1 transmits an enable signal to the MOS transistor Q1 and the MOS transistor Q2 to turn off the MOS transistor Q1 and the MOS transistor Q2, so that the mobile power source stops outputting power to the external load. In addition, the fourth pin of the control chip U1 detects and samples the voltage of the resistor R24 to calculate a discharge current, and the remaining service time is calculated by comparing the voltage of the resistor R24 with the remaining capacity of the battery pack and is displayed on a nixie tube L1. The first output unit controls the power output by means of two MOS transistors and a connecting piece, and the external load is directly plugged into the connecting piece to be supplied with power, so that power is supplied easily and efficiently; output power information is monitored in real time, and the remaining service time is calculated and displayed on the nixie tube 621; and the overall circuit structure is simple, complete functions are realized, and the practicability of the mobile power source is greatly improved.

The second output unit comprises a connecting piece J1, a MOS transistor Q4, a resistor R2, a resistor R9, a resistor R11, a resistor R12, and a resistor R27;

A first pin of the connecting piece J1 is connected to the power input module, a second pin and a third pin of the connecting piece J1 are connected, a fourth pin of the connecting piece J1 is connected to a drain of the MOS transistor Q4, a gate of the MOS transistor Q4 is connected to a thirteenth pin of the control chip U1 and one terminal of the resistor R11, the other terminal of the resistor R11 is grounded; a source of the MOS transistor Q4 is connected to one terminal of the resistor R12 and one terminal of the resistor R27, the other terminal of the resistor R12 is grounded, one terminal of the resistor R27 is connected to an eleventh pin of the control chip U1, and a fourth pin of the connecting piece J1 is grounded by means of the resistor R2 and is connected to a sixth pin of the control chip U1 by means of the resistor R9.

Preferably, the second output unit supplies power to the external load by means of a USB interface, and the external load is charged after being plugged into the USB interface. In a normal state, the control chip U1 sends an enable signal to the MOS transistor Q4 to control the MOS transistor Q4 to be turned on, and then the second output unit is controlled to supply power to the external load normally; when the temperature is abnormal or the voltage of the battery pack is too low, the control chip U1 cut off the enable signal to turn off the MOS transistor Q4, and then the power output of the second output unit is turned off. In addition, the control chip U1 monitors and samples the voltage of the resistor R9 in real time, then calculates an output current of the second output unit, calculates the remaining service time according to the capacity of the battery pack and the output current, displays the remaining service time on the nixie tube 621, and also displays the discharge state on the nixie tube 621, such that users can reasonably set the usage frequency and charging frequency of the mobile power source.

As shown in FIG. 10 to FIG. 17, on the basis of the above implementation, the power input module comprises: a charge and discharge chip U2, a connecting piece J2, a MOS transistor Q3, an inductor L1, a resistor R3, a resistor R5, a resistor R6, a resistor R8, a capacitor C2, and a capacitor C3;

A first pin of the connecting piece J2 is connected to the external power source and is connected to a fifth pin of the control chip U1 by means of the resistor R3, the first pin of the connecting piece J2 is connected to one terminal of the resistor R5, one terminal of the resistor R6 and a source of the MOS transistor Q4, the other terminal of the resistor R5 is grounded by means of the capacitor C3, the other terminal of the resistor R6 is connected to a gate of the MOS transistor Q3 and a first pin of the control chip U1, a drain of the MOS transistor Q3 is connected to a fourth pin of the charge and discharge chip U2, a first pin of the charge and discharge chip U2 is connected to one terminal of the resistor R8 and one terminal of the inductor L1, the other terminal of the resistor R8 is grounded by means of the capacitor C2, the other terminal of the inductor L1 is connected to a third pin of the charge and discharge chip U2, a second pin of the charge and discharge chip U2 is grounded, a third pin of the charge and discharge chip U2 is connected to the positive pole of the battery pack, and an eighth pin of the charge and discharge chip U2 is connected to the power output module.

Preferably, the charge and discharge chip U2 is preferably a chip SY3511D and supplies power to the battery pack by means of the connecting piece J2; when a power output is detected in the normal working state of the mobile power source, the control chip U1 sends an enable signal to the MOS transistor Q3 to control the MOS transistor Q3 to be turned on, so that the input power can be transmitted to the MOS transistor Q3 by means of the connecting piece J2 and then charges the battery pack by means of the charge and discharge chip U2, the control chip U1 monitors the input power in real time by means of the fifth pin, and the charge state of the battery pack is displayed on the nixie tube 621.

As shown in FIG. 10 to FIG. 17, on the basis of the above implementation, the display module comprises a nixie tube L1, a resistor R18, a resistor R19, a resistor R20, a resistor R21, a resistor R22, and a resistor R23;

A first pin of the nixie tube L1 is connected to a twentieth pin of the control chip U1 by means of the resistor R18, a nixie tube LED2 is connected to a nineteenth pin of the control chip U1 by means of the resistor R19, a nixie tube LED3 is connected to an eighteenth pin of the control chip U1 by means of the resistor R20, a nixie tube LED4 is connected to a seventeenth pin of the control chip U1 by means of the resistor R21, a nixie tube LED5 is connected to a sixteenth pin of the control chip U1 by means of the resistor R22, and a nixie tube LED6 is connected to a fifteenth pin of the control chip U1 by means of the resistor R23.

Preferably, the display module consists of a nixie tube L1 and peripheral resistors, wherein the nixie tube L1 generates a corresponding display signal according to a control signal transmitted by the control chip and can display the remaining service time of the mobile power source when the mobile power source is connected to the external load, the battery percentage of the battery pack, and the charge state and the discharge state of the battery pack. All working states of the mobile power source can be displayed on the nixie tube 621, so that users can visually know the working state of the mobile power source and set the charge and discharge frequency of the mobile power source according to the actual use condition.

As shown in FIG. 10 to FIG. 17, on the basis of the above implementation, the power module further comprises: a monitoring module. The monitoring module comprises a temperature monitoring unit used for monitoring the working temperature of the mobile power source and a voltage monitoring unit used for monitoring the voltage state of the battery pack, wherein the temperature monitoring unit comprises a temperature sensor connected to the control chip U1, and the voltage monitoring unit comprises a voltage sensor connected to the control chip U1.

Preferably, the temperature monitoring unit comprises a temperature sensor NTC and a resistor R16, wherein two terminals of the resistor R16 are connected to a power source and a tenth pin of the control chip U1 respectively, the tenth pin of the control chip U1 is grounded by means of the temperature sensor NTC, and the control chip U1 acquires the working temperature of the mobile power source by means of the temperature sensor NTC; when the temperature is too high, the control chip U1 turns off all inputs; when the temperature returns to normal, the inputs resume, so that the situation where the mobile power source is burned out due to a high temperature is avoided. The voltage monitoring unit comprises a voltage sensor R14 and a resistor R15, two terminals of the voltage sensor R14 are connected to the battery pack and an eighth pin of the control chip U1 respectively, the eighth pin of the control chip U1 is grounded by means of the resistor R15, and the control chip U1 monitors the battery voltage in real time by means of the voltage monitoring unit; when the battery voltage is too low, all outputs are turned off; and the inputs resume after the battery pack is charged, so that damage to the battery pack caused by over-discharge is avoided.

It should be noted that all directional indications (such as "upper", "lower", "left", "right", "front", "back") in the embodiments of the invention are merely used to explain relative relations or motions between components at a certain pose (as shown in the drawings), and when the specific pose changes, the directional indications shall change accordingly.

In addition, descriptive terms such as "first", "second", and "one" in the invention are merely for the purpose of description, and should not be construed as indicating or implying relative importance or implicitly indicating the number of technical features referred to. So, a feature defined by "first" or "second" may explicitly or implicitly indicate the inclusion of at least one said feature. Unless otherwise explicitly defined, "multiple" means at least two, such as two or three.

Unless otherwise clearly specified and defined, terms such as "connect" and "fix" in the invention should be broadly understood. For example, "fix" may refer to fixed connection, detachable connection or integrated connection, or mechanical connection or electrical connection, or direct connection or indirect connection by means of an intermediate medium, or internal communication or interaction between two elements. Those ordinarily skilled in the art may understand the specific meaning of these terms in the invention as the case may be.

In addition, the technical solutions of the embodiments of the invention may be combined as long as they can be realized by those ordinarily skilled in the art. Any contradictory or unrealizable combinations of the technical solutions should be considered non-existent and are not within the protection scope of the invention.

What is claimed is:

1. A tool lamp with a mobile power source, comprising:
a handle provided with a power chamber and a sliding slot, wherein the power chamber has a strip-shaped opening, a lock piece and a bottom hole are disposed in the power chamber, and a slidable slider is disposed in the sliding slot;
a movable lamp base detachably connected to the handle; and
a mobile power box inserted into the power chamber via the strip-shaped opening and provided with a push member located in the bottom hole, wherein the push member is able to push the mobile power box out of the power chamber, and a groove portion is formed in a side wall of the mobile power box; when the mobile power box is located in the power chamber, the lock piece is aligned with the groove portion, is pushed by the slider to move towards the groove portion, and stretches into the groove portion to prevent the mobile power box from moving;
the mobile power box comprises a shell and a power module embedded in the shell, the shell is provided with a communication interface connected to an external load, and the power module is electrically connected to the communication interface;
the power module comprises a battery pack and a circuit board, the communication interface is provided with a first contact, a second contact, and a third contact, the first contact, the second contact, and the third contact are all electrically connected to the circuit board, the circuit board is provided with a first connecting point, a second connecting point, and a third connecting point, the first connecting point is connected to the first contact and a positive pole of the battery pack, the second connecting point is connected to the second contact, and the third connecting point is connected to the third contact and a negative pole of the battery pack;
wherein, the power module further comprises:
a power input module;
a control module comprising a control chip U1, wherein a second pin of the control chip U1 is connected to the external load by means of a first connecting piece;
a power output module connected to the control chip U1, used for outputting electric energy, obtained by charging the battery pack, in a preset manner, and comprising a first output unit and a second output unit, wherein the first output unit is used for outputting the electric energy, obtained by charging the battery pack, to the external load in a plugged manner by means of a second connecting piece, and controlling an output state according to a control signal sent by the control module; and the second output unit is used for outputting the electric energy, obtained by charging the battery pack, to the external load by means of a USB interface, and controlling the output state according to the control signal sent by the control module; and a display module connected to the control chip U1 and used for displaying a remaining service time of the battery pack in a state where the battery pack is connected to the external load.

2. The tool lamp with a mobile power source according to claim 1, wherein the first contact, the second contact, and the third contact are arranged side by side, the first contact and the third contact are located on two sides of the second contact respectively, the shell is provided with a first groove, a second groove, and a third groove that correspond to the first contact, the second contact, and the third contact respectively, the first contact and the third contact each have an open end, and a closed end electrically connected to the circuit board, the first contact is embedded in the first groove, the third contact is embedded in the third groove, the second contact is T-shaped and comprises a horizontal end and a vertical end, a horizontal groove and a vertical groove are formed in the second groove and are connected by means of a first guide slot, the horizontal end is disposed in the horizontal groove, and the vertical end is disposed in the vertical groove.

3. The tool lamp with a mobile power source according to claim 2, wherein the shell comprises a first shell provided with the communication interface and a second shell embedded with the power module, and the first shell and the second shell are detachably connected.

4. The tool lamp with a mobile power source according to claim 1, wherein the first output unit comprises a MOS transistor Q1, a MOS transistor Q2, a resistor R1, a resistor R24, a resistor R26, and a second connecting piece J3;

a positive pole of the second connecting piece J3 is connected to the positive pole of the battery pack, a negative pole of the second connecting piece J3 is connected to a fourth pin of the control chip U1, a fifth pin of the MOS transistor Q1 and a fifth pin of the MOS transistor Q2, and is grounded by means of the resistor R24; a fourth pin and a sixth pin of the MOS transistor Q1 and a fourth pin and a sixth pin of the MOS transistor Q2 are connected to a third pin of the control chip U1; a first pin and a third pin of the MOS transistor Q1 and a first pin and a third pin of the MOS transistor Q2 are connected to a fourteenth pin of the control chip U1 by means of the resistor R26, and a third pin of the MOS transistor Q2 is grounded by means of the resistor R1;

the second output unit comprises: a connecting piece J1, a MOS transistor Q4, a resistor R2, a resistor R9, a resistor R11, a resistor R12, and a resistor R27;

a first pin of the connecting piece J1 is connected to the power input module, a second pin and a third pin of the connecting piece J1 are connected, a fourth pin of the connecting piece J1 is connected to a drain of the MOS transistor Q4, a gate of the MOS transistor Q4 is connected to a thirteenth pin of the control chip U1 and one terminal of the resistor R11, another terminal of the resistor R11 is grounded; a source of the MOS transistor Q4 is connected to one terminal of the resistor R12 and one terminal of the resistor R27, another terminal of the resistor R12 is grounded, another terminal of the resistor R27 is connected to an eleventh pin of the control chip U1, and a fourth pin of the connecting piece J1 is grounded by means of the resistor R2 and is connected to a sixth pin of the control chip U1 by means of the resistor R9.

5. The tool lamp with a mobile power source according to claim 4, wherein the power input module comprises: a charge and discharge chip U2, a connecting piece J2, a MOS transistor Q3, an inductor L1, a resistor R3, a resistor R5, a resistor R6, a resistor R8, a capacitor C2, and a capacitor C3;

a first pin of the connecting piece J2 is connected to an external power source, and is connected to a fifth pin of the control chip U1 by means of the resistor R3; the first pin of the connecting piece J2 is connected to one terminal of the resistor R5, one terminal of the resistor R6 and a source of the MOS transistor Q3, another terminal of the resistor R5 is grounded by means of the capacitor C3, another terminal of the resistor R6 is connected to a gate of the MOS transistor Q3 and a first pin of the control chip U1; a drain of the MOS transistor Q3 is connected to a fourth pin of the charge and discharge chip U2, a first pin of the charge and discharge chip U2 is connected to one terminal of the resistor R8 and one terminal of the inductor L1, another terminal of the resistor R8 is grounded by means of the capacitor C2, another terminal of the inductor L1 is connected to a third pin of the charge and discharge chip U2, a second pin of the charge and discharge chip U2 is grounded, a third pin of the charge and discharge chip U2 is connected to the positive pole of the battery pack, and an eighth pin of the charge and discharge chip U2 is connected to the power output module.

6. The tool lamp with a mobile power source according to claim 5, wherein the display module comprises: a nixie tube L1, a resistor R18, a resistor R19, a resistor R20, a resistor R21, a resistor R22, and a resistor R23;

a first pin of the nixie tube L1 is connected to a twentieth pin of the control chip U1 by means of the resistor R18, a nixie tube LED2 is connected to a nineteenth pin of the control chip U1 by means of the resistor R19, a nixie tube LED3 is connected to an eighteenth pin of the control chip U1 by means of the resistor R20, a nixie tube LED4 is connected to a seventeenth pin of the control chip U1 by means of the resistor R21, a nixie tube LED5 is connected to a sixteenth pin of the control chip U1 by means of the resistor R22, and a nixie tube LED6 is connected to a fifteenth pin of the control chip U1 by means of the resistor R23.

7. The tool lamp with a mobile power source according to claim 1, wherein the power module further comprises a monitoring module, and the monitoring module comprises a temperature monitoring unit used for monitoring a working temperature of the mobile power source and a voltage monitoring unit used for monitoring a voltage state of the battery pack, the temperature monitoring unit comprises a temperature sensor connected to the control chip U1, and the voltage monitoring unit comprises a voltage sensor connected to the control chip U1.

* * * * *